(12) United States Patent
Moriuchi et al.

(10) Patent No.: US 9,733,464 B2
(45) Date of Patent: Aug. 15, 2017

(54) FOCUS DETECTION UNIT AND OPTICAL APPARATUS

(71) Applicant: MITUTOYO CORPORATION, Kanagawa (JP)

(72) Inventors: Eisuke Moriuchi, Kanagawa (JP); Tatsuya Nagahama, Kanagawa (JP); Yuko Shishido, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 64 days.

(21) Appl. No.: 14/718,349

(22) Filed: May 21, 2015

(65) Prior Publication Data

US 2015/0346475 A1    Dec. 3, 2015

(30) Foreign Application Priority Data

May 28, 2014 (JP) ................................ 2014-110362

(51) Int. Cl.
  *G02B 7/38* (2006.01)
  *G02B 21/24* (2006.01)
  *G02B 7/34* (2006.01)
(52) U.S. Cl.
  CPC ............. *G02B 21/244* (2013.01); *G02B 7/34* (2013.01); *G02B 7/38* (2013.01); *G02B 21/245* (2013.01)

(58) Field of Classification Search
  CPC ........ G02B 21/244; G02B 7/34; G02B 21/245; G02B 7/38
  See application file for complete search history.

(56) References Cited

U.S. PATENT DOCUMENTS 5,659,384 A * 8/1997 Ina ..................... G02B 21/0016
                                                    355/53

FOREIGN PATENT DOCUMENTS

JP            10-142515         5/1998

* cited by examiner

*Primary Examiner* — Tony Ko
(74) *Attorney, Agent, or Firm* — Greenblum & Bernstein, P.L.C.

(57) ABSTRACT

A focus detection unit to adjust a focal point of an image, of an object, formed by an optical system includes a first output section, a second output section, and a projection optical system. The first output section includes a first light modulation element configured to generate a first pattern image based on incident light and is configured to output the generated first pattern image. The second output section includes a second light modulation element configured to generate a second pattern image based on incident light and is configured to output the generated second pattern image. The projection optical system is configured to project the output first pattern image and the output second pattern image such that the output first pattern image and the output second pattern image have a predetermined positional relationship at an in-focus position of the optical system.

16 Claims, 7 Drawing Sheets

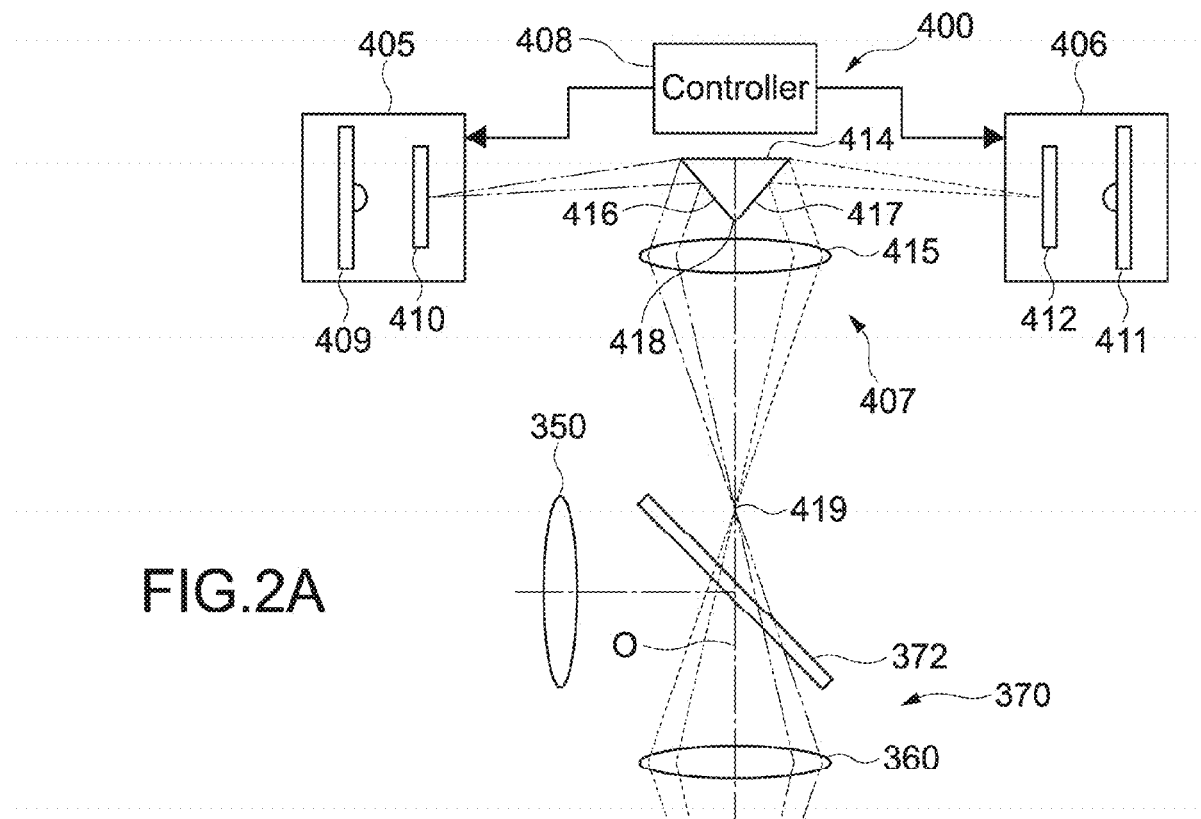
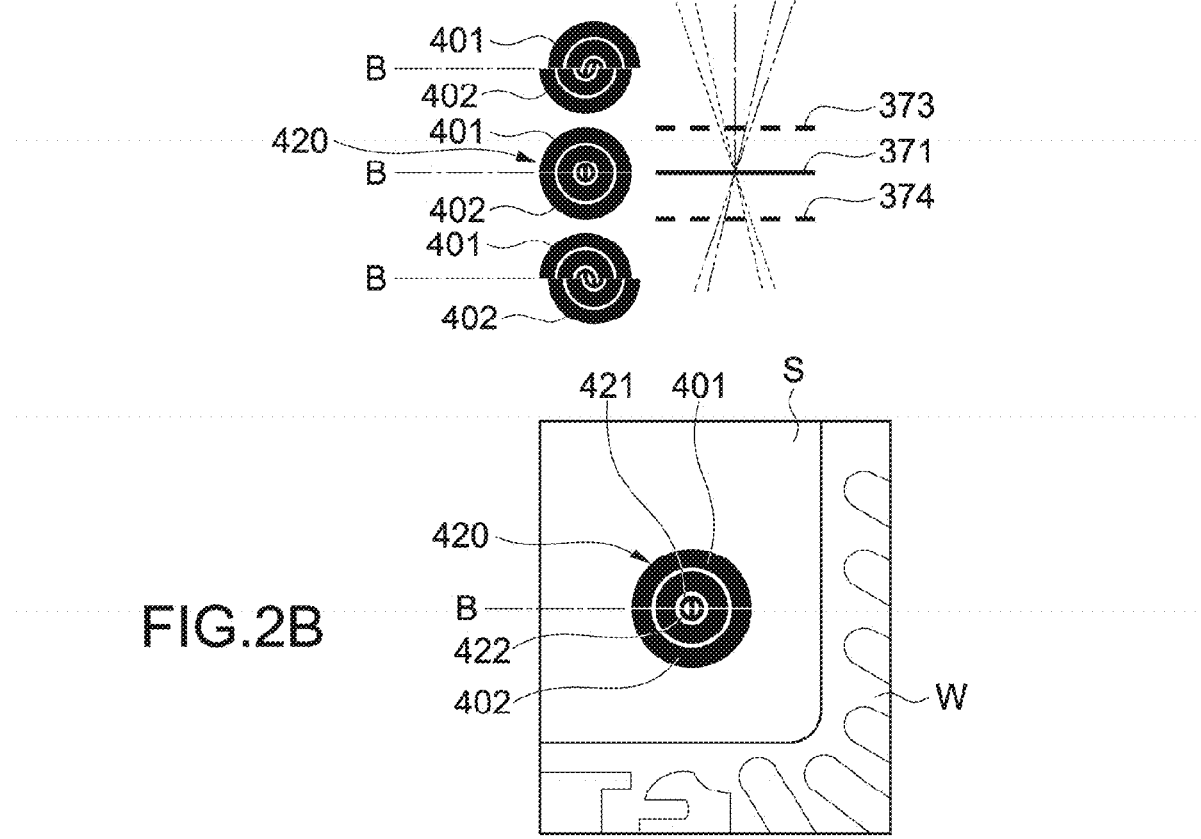
FIG.2A
FIG.2B

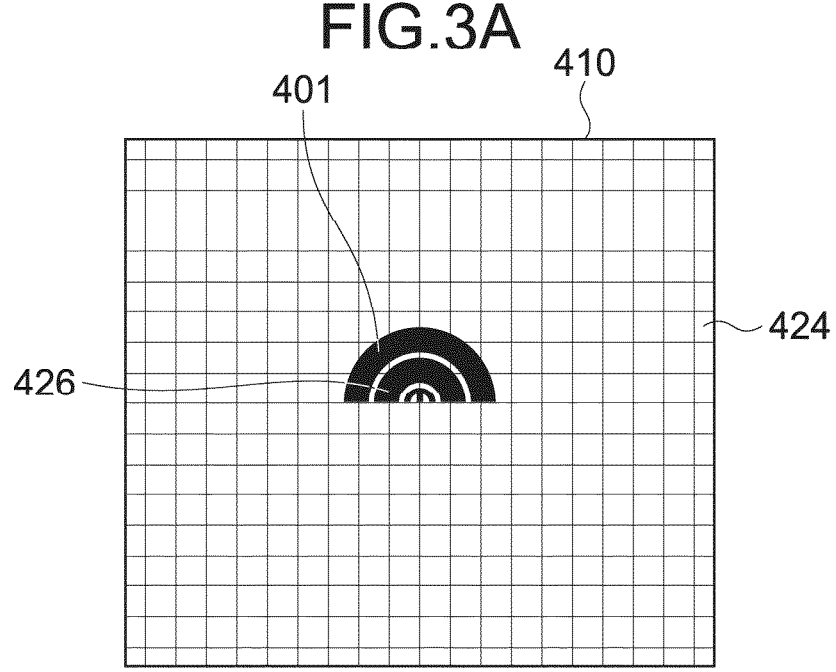
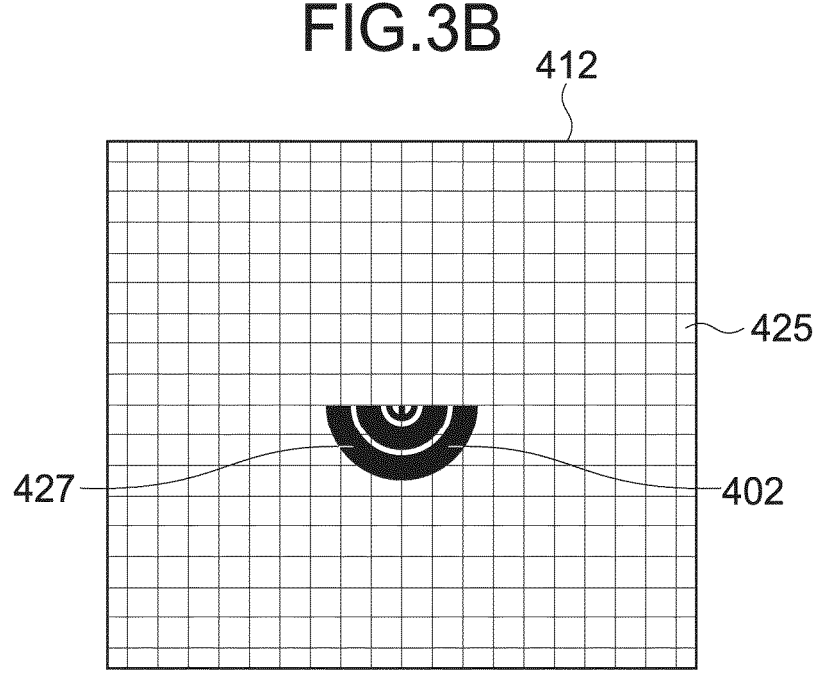

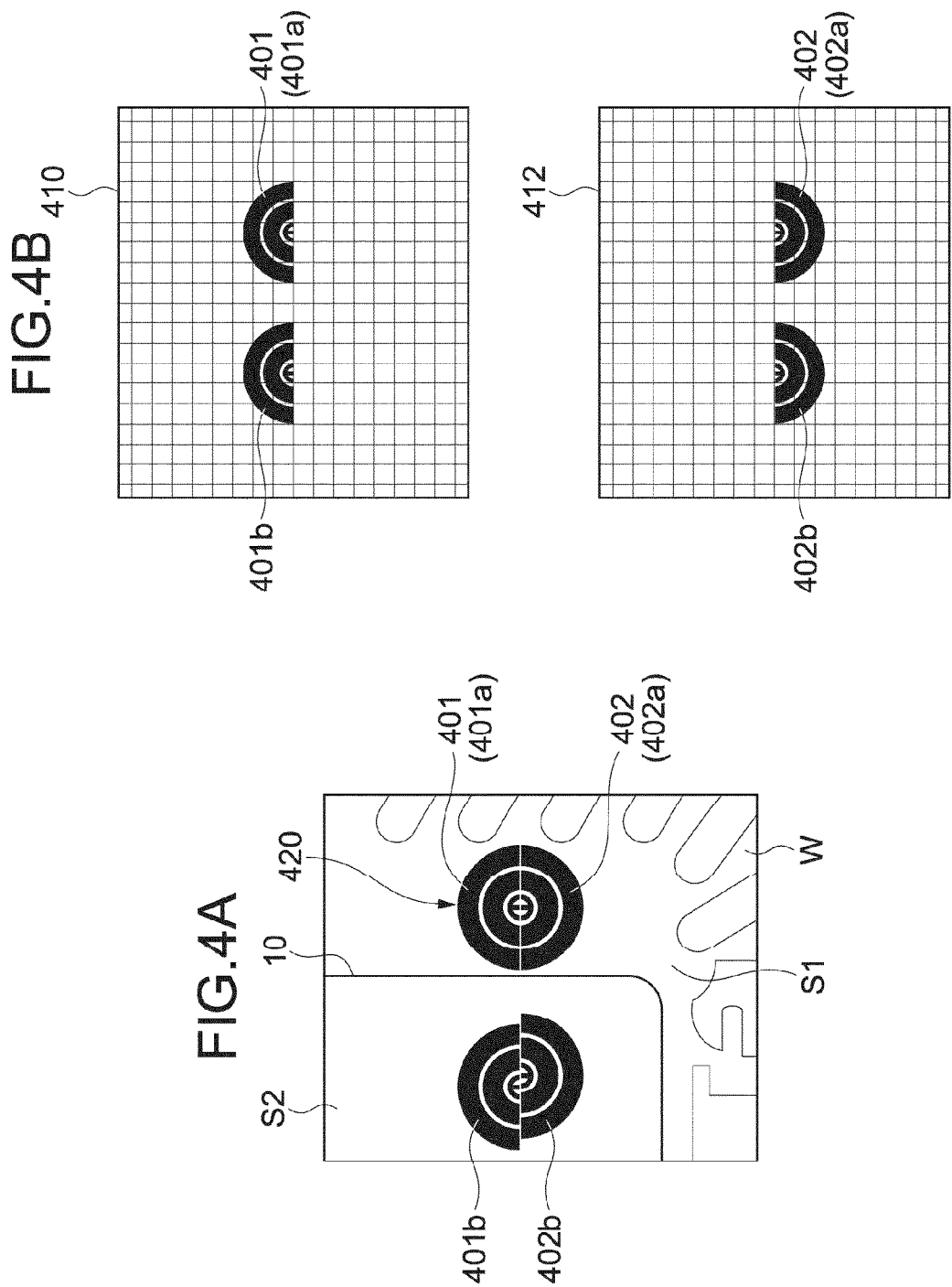

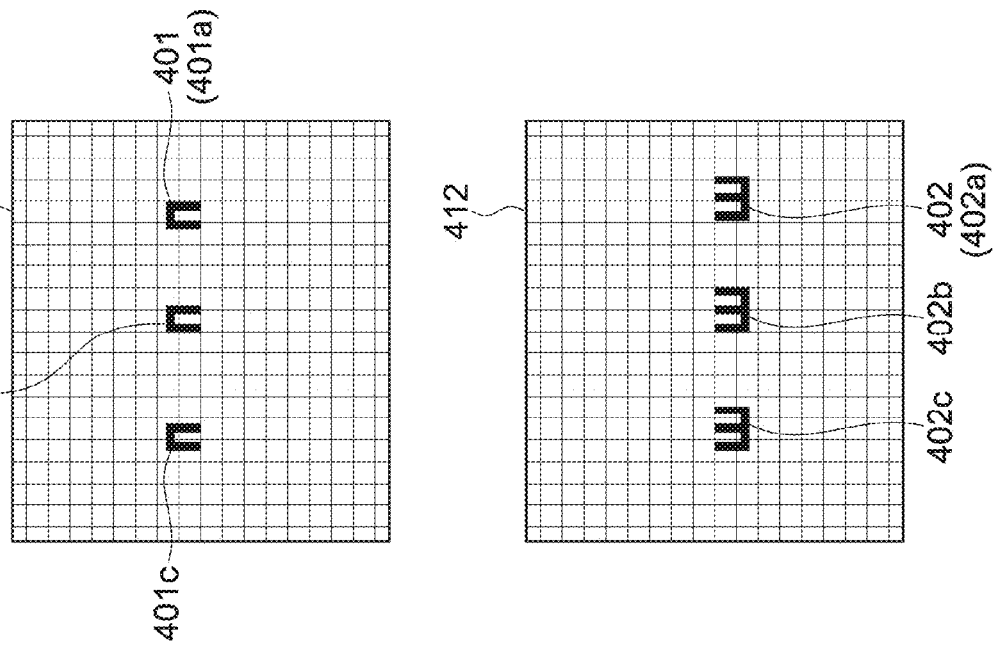
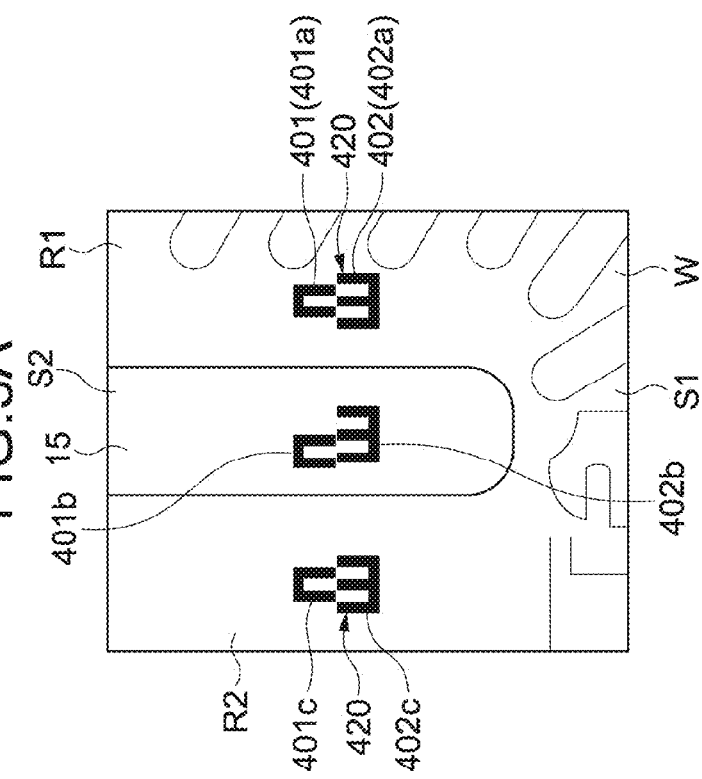

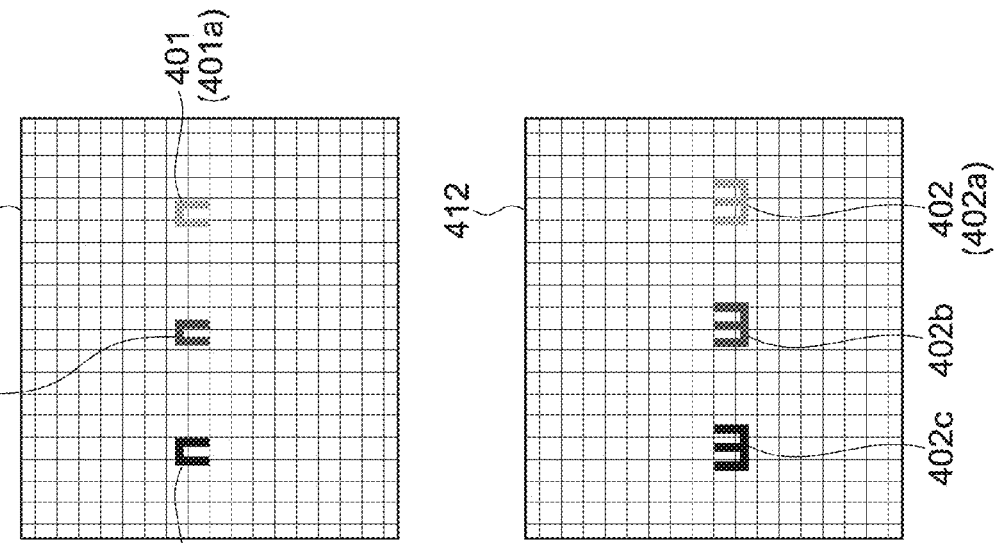
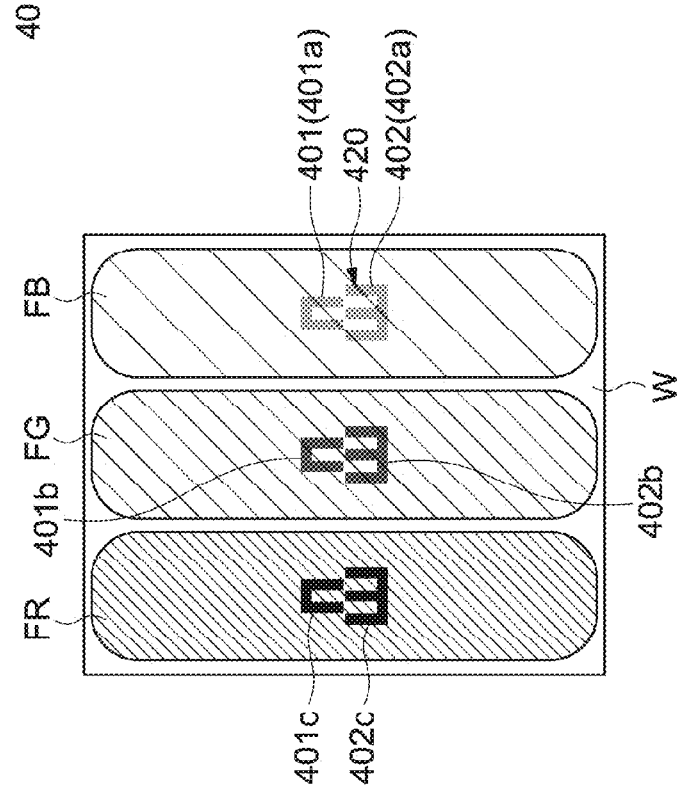

FOCUS DETECTION UNIT AND OPTICAL APPARATUS

CROSS REFERENCE TO RELATED APPLICATIONS

This application claims the benefit of Japanese Priority Patent Application JP 2014-110362 filed May 28, 2014, the entire contents of which are incorporated herein by reference.

BACKGROUND

The present disclosure relates to a focus detection unit applicable to an optical apparatus such as a microscope, and to the optical apparatus.

Techniques for accurately detecting a focus have been studied in optical devices such as measuring microscopes. For example, Japanese Patent Application Laid-open No. Hei 10-142515 discloses a focus detection unit using an interposing system. The focus detection unit forms an image of sight double beams and a sight single beam on an image surface of a microscope optical system, projects the image onto an object to be observed, and adjusts the sight single beam to be sandwiched at the center of the sight double beams, thus obtaining a focal point. As shown in FIG. 1 of Japanese Patent Application Laid-open No. Hei 10-142515, the sight double beams and the sight single beam are separated from each other using a prism 18. This can simplify the optical system and form a compact focus detection unit, as compared with the interposing system in related art (Japanese Patent Application Laid-open No. Hei 10-142515, paragraphs [0024] to [0026]).

SUMMARY

Recently, along with the miniaturization of a work, the achievement of focal point adjustment with high accuracy has been further demanded. In the above-mentioned focus detection unit disclosed in Japanese Patent Application Laid-open No. Hei 10-142515, the sight double beams and the sight single beam are formed using slit masks. As a result, a shape, a projection position, and the like of a pattern projected onto the object are limited, and thus there is a possibility that a demand to achieve high accuracy is not satisfied.

In view of the circumstances as described above, it is desirable to provide a focus detection unit and an optical apparatus that enable a focal point to be adjusted highly accurately.

According to an embodiment of the present disclosure, there is provided a focus detection unit to adjust a focal point of an image, of an object, formed by an optical system, the focus detection unit including a first output section, a second output section, and a projection optical system.

The first output section includes a first light modulation element configured to generate a first pattern image based on incident light, the first output section being configured to output the generated first pattern image.

The second output section includes a second light modulation element configured to generate a second pattern image based on incident light, the second output section being configured to output the generated second pattern image.

The projection optical system is configured to project the output first pattern image and the output second pattern image such that the output first pattern image and the output second pattern image have a predetermined positional relationship at an in-focus position of the optical system.

In this focus detection unit, the first and second pattern images that are references when a focal point is adjusted by the light modulation elements are generated. This enables appropriate setting of the shapes, the projection positions, and the like of the first and second pattern images. As a result, a focal point can be adjusted highly accurately.

The first pattern image may have a first center. In this case, the second pattern image may have a second center. Further, the projection optical system may be configured to project the first pattern image and the second pattern image such that the first center and the second center are adjacent to each other at the in-focus position.

This allows easy determination that focal points are matched.

The first light modulation element may be capable of changing a shape of the first pattern image. In this case, the second light modulation element may be capable of changing a shape of the second pattern image into a shape corresponding to the changed shape of the first pattern image.

This can project the first and second pattern images onto a minute area or an area having a specific shape, for example.

The first light modulation element may include a plurality of first pixels and may be capable of changing positions of first pattern image pixels in the plurality of first pixels, the first pattern image pixels forming the first pattern image. In this case, the second light modulation element may include a plurality of second pixels and may be capable of changing positions of second pattern image pixels in the plurality of second pixels to positions corresponding to the changed positions of the first pattern image pixels, the second pattern image pixels forming the second pattern image.

In such a manner, in the first and second light modulation elements, the positions of the first and second pattern image pixels that form the first and second pattern images, respectively, can be appropriately changed. Consequently, the projection positions of the first and second pattern images having a predetermined positional relationship at the in-focus position can be appropriately changed.

The first light modulation element may be configured to generate a plurality of first pattern images. In this case, the second light modulation element may be configured to generate a plurality of second pattern images respectively corresponding to the plurality of first pattern images. Further, the projection optical system may be configured to project the plurality of first pattern images and the plurality of second pattern images respectively corresponding thereto at different projection positions such that each of the plurality of first pattern images and a corresponding one of the plurality of second pattern images have the predetermined positional relationship at the in-focus position of the optical system.

This can adjust focal points of different areas of the object to be matched without moving the position of the object, for example. As a result, this can shorten measurement time, for example.

The first output section may be configured to output the first pattern image having a predetermined color. In this case, the second output section may be configured to output the second pattern image having a color corresponding to the predetermined color.

For example, appropriately setting the color of the pattern image in accordance with the color of the object can improve the visibility, and a focal point can be adjusted highly accurately.

The predetermined color and the color corresponding to the predetermined color may be the same color and may be each a complementary color with respect to a color of an area onto which the first pattern image and the second pattern image of the object are projected.

This can sufficiently improve the visibility of the user.

Each of the first light modulation element and the second light modulation element may include a liquid crystal panel.

Each of the first light modulation element and the second light modulation element may include a micromirror device.

According to another embodiment of the present disclosure, there is provided an optical apparatus including a mounting portion, an imaging optical system, and the focus detection unit described above.

The mounting portion is configured to mount an object.

The imaging optical system is configured to form an image of the object mounted onto the mounting portion.

The first light modulation element may be configured to generate a plurality of first pattern images. In this case, the second light modulation element may be configured to generate a plurality of second pattern images respectively corresponding to the plurality of first pattern images. Further, the projection optical system may be configured to project the plurality of first pattern images and the plurality of second pattern images respectively corresponding thereto at different projection positions such that each of the plurality of first pattern images and a corresponding one of the plurality of second pattern images have the predetermined positional relationship at the in-focus position of the optical system.

The optical apparatus may further include a calculation section configured to calculate, in a state where a first reference pattern image to be a reference in the plurality of first pattern images and a second reference pattern image corresponding to the first reference pattern image form an image having the predetermined positional relationship, based on a positional relationship between another one of the plurality of first pattern images and a corresponding one of the plurality of second pattern images, the first reference pattern image and the second reference pattern image being projected onto a first projection surface, the other first pattern image and the second pattern image corresponding thereto being projected onto a second projection surface, a height of the second projection surface with respect to the first projection surface.

In such a manner, the height may be measured in accordance with a positional relationship between the first and second pattern images.

As described above, according to the present disclosure, it is possible to adjust a focal point highly accurately. It should be noted that the effects described herein are not necessarily limited and any effect disclosed herein may be produced.

BRIEF DESCRIPTION OF DRAWINGS

FIGS. 2A and 2B are diagrams each schematically showing a configuration example of a detection unit according to the embodiment of the present disclosure;

FIGS. 3A and 3B are diagrams each schematically showing a configuration example of a liquid crystal panel according to the embodiment of the present disclosure;

FIGS. 4A and 4B are diagrams each showing a configuration example of first and second pattern images projected onto a work;

FIGS. 5A and 5B are diagrams each showing a configuration example of first and second pattern images projected onto a work;

FIGS. 6A and 6B are diagrams each showing a configuration example of first and second pattern images projected onto a work.

DETAILED DESCRIPTION OF EMBODIMENTS

Hereinafter, embodiments of the present disclosure will be described with reference to the drawings.

(Microscope)

Figure 1:
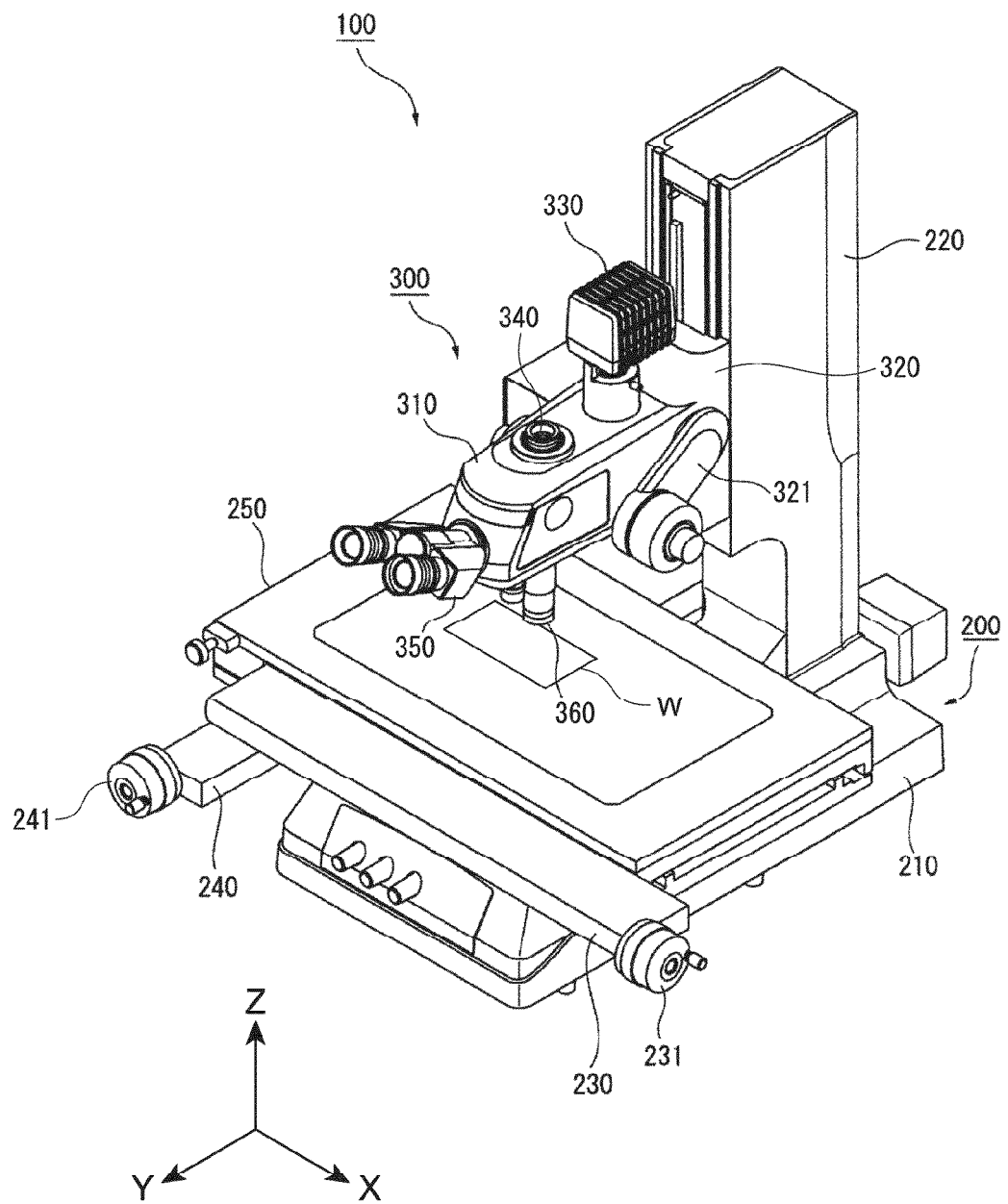
FIG. 1 is a diagram schematically showing the outer appearance of a microscope according to an embodiment of the present disclosure.

FIG. 1 is a diagram schematically showing the outer appearance of a microscope as an optical apparatus according to an embodiment of the present disclosure. A microscope 100 includes a mounting base 200 and a microscope main body 300. The mounting base 200 includes a base 210, a support column 220, an X-axis moving portion 230, a Y-axis moving portion 240, and a stage (mounting portion) 250. The base 210 is mounted onto and fixed to a work table (not shown) or the like. The support column 220 is connected to the base 210 so as to extend in a vertical direction (Z-axis direction).

The X-axis moving portion 230 and the Y-axis moving portion 240 are disposed on the base 210. The X-axis moving portion 230 and the Y-axis moving portion 240 are connected to the stage 250. The stage 250 is provided so as to be movable in a horizontal direction (XY-plane direction) relative to the base 210. By an operation of rotating a rotating operation portion 231 of the X-axis moving portion 230, the stage 250 is moved in an X-axis direction. Additionally, by an operation of rotating a rotating operation portion 241 of the Y-axis moving portion 240, the stage 250 is moved in a Y-axis direction. It should be noted that a work W (object) as an observation target is mounted onto the stage 250.

The microscope main body 300 is provided to the support column 220 so as to be movable along the Z-axis direction. The microscope main body 300 includes a casing 310, a Z-axis moving portion 320, a light source portion 330, a camera port 340, eyepieces 350, and an objective lens 360. The casing 310 is moved in the Z-axis direction by an operation of rotating a rotating operation portion 321 of the Z-axis moving portion 320.

The light source portion 330 includes, for example, a light source such as a halogen lamp, or a solid-state light source such as a light emitting diode (LED) and a laser diode (LD). Light emitted from the light source portion 330 passes through an illumination optical system (not shown) in the casing 310 and is applied to the work W along a substantially vertical direction. The light applied to the work W is reflected, and an image is formed at a predetermined magnification by an imaging optical system (not shown) in the casing 310 including the objective lens 360, an imaging lens, and the like. As a result, an image of the work W is obtained.

A user can observe the image of the work W by looking into the eyepieces 350. Further, the user can capture a digital image of the work W by setting a digital camera or the like to the camera port 340. For example, an observation, a measurement, and the like can be performed based on the digital image obtained by imaging.

A specific configuration of each optical system disposed in the casing 310 is not limited. For example, optical members such as a half mirror and a total reflection mirror are appropriately used. Additionally, the same optical members are also used in the illumination optical system described above and in the imaging optical system in some cases.

The focal point (focus) of the image of the work W is adjusted by operating the rotating operation portion 321 of the Z-axis moving portion 320 and moving the casing 310 in the Z-axis direction. For example, the user moves the position of the objective lens 360, which is attached to the casing 310, in the Z-axis direction while looking into the eyepieces 350 or viewing a captured image of the work W. The user then moves the surface of the work W as an observation target to an in-focus position of the imaging optical system, thus adjusting a focal point.

Further, the microscope 100 includes a digital counter (not shown). The digital counter can indicate position coordinates of X, Y, and Z axes. For example, a focal point is manually adjusted on the surface of the work W. The digital counter indicates position coordinates (X coordinate, Y coordinate) of the stage 250 on the XY plane and a position coordinate (Z coordinate) of the casing 310 at that time. A reference point (point of origin) of each coordinate may be arbitrarily set.

(Focus Detection Unit)

A focus detection unit (hereinafter, simply referred to as detection unit) according to an embodiment of the present disclosure is attached to the microscope 100 described above. The detection unit can highly accurately adjust a focal point of the image of the work W, the image being formed by the imaging optical system. The detection unit is attached to the camera port 340 shown in, for example, FIG. 1 for use.

FIGS. 2A and 2B are diagrams each schematically showing a configuration example of a detection unit 400 according to the embodiment of the present disclosure. FIG. 2A is a diagram schematically showing the overall configuration of the detection unit 400. FIG. 2B is a diagram showing an example a first pattern image and a second pattern image that are projected onto the work W by the detection unit 400. The first and second pattern images are references when a focal point is adjusted.

As shown in FIG. 2A, the detection unit 400 includes a first output section 405, a second output section 406, a projection optical system 407, and a controller 408. The first output section 405 outputs a first pattern image 401. The second output section 406 outputs a second pattern image 402. The projection optical system 407 projects the first and second pattern images 401 and 402 such that the first and second pattern images 401 and 402 have a predetermined positional relationship at an in-focus position 371 of an imaging optical system 370.

The first output section 405 includes a backlight 409, a transmissive liquid crystal panel (LCD) 410, an output lens (not shown), and the like. The liquid crystal panel 410 serves as a first light modulation element that generates the first pattern image 401 based on incident light from the backlight 409. It should be noted that a reflective liquid crystal panel may be used.

The second output section 406 includes a backlight 411, a liquid crystal panel 412, an output lens (not shown), and the like. The liquid crystal panel 412 serves as a second light modulation element that generates the second pattern image 402 based on incident light from the backlight 411. As shown in FIG. 2A, the first and second output sections 405 and 406 are disposed to be opposed to each other such that optical axes thereof overlap.

Specific configurations of the first and second output sections 405 and 406 are not limited. For example, halogen lamps, LEDs, and the like may be used for the backlights 409 and 411. The following configuration may also be adopted: light emitted from one light source is split to be incident on the liquid crystal panels 410 and 412.

Further, a specific configuration of the liquid crystal panel is not also limited. Besides, an arbitrary configuration that enables the generation of an image using a liquid crystal panel and the output of the image may be used as each of the first and second output sections 405 and 406.

The controller 408 controls operations of respective mechanisms in the first and second output sections 405 and 406. The controller 408 can be achieved by a control circuit including, for example, a peripheral interface controller (PIC). The PIC includes a CPU, memories (RAM, ROM), an input/output (I/O), and the like in one chip.

The controller 408 can control the liquid crystal panels 410 and 412 and the like based on an operation of the user, for example. For that reason, the detection unit 400 is provided with an operation portion that receives an operation of the user. As the operation portion, a console that is communicable with the controller 408 in a wired or wireless manner is used, for example.

The projection optical system 407 includes a prism 414 and a projection lens 415. The prism 414 has the shape of a triangular prism. The projection lens 415 is disposed in front of the prism 414 (on the side toward the work W). The prism 414 is disposed at a substantially intermediate position between the first and second output sections 405 and 406. The prism 414 includes a first reflective surface 416 and a second reflective surface 417. The first reflective surface 416 reflects the first pattern image 401 output from the first output section 405. The second reflective surface 417 reflects the second pattern image 402 output from the second output section 406. A vertex 418 to be a boundary of the first and second reflective surfaces 416 and 417 is disposed on an optical axis O of the imaging optical system 370, e.g., on an optical axis toward the camera port 340 of FIG. 1.

The projection lens 415 is disposed on the optical axis O of the imaging optical system 370 and forms the first and second pattern images 401 and 402, which are reflected on the prism 414, at a predetermined imaging position 419. The first and second pattern images 401 and 402 formed at the imaging position 419 are projected onto the work W by a half mirror 372 and the objective lens 360 included in the imaging optical system 370. The predetermined imaging position 419 is typically a position that is substantially equal to the imaging position of an intermediate image, of the work W, formed by the imaging optical system 370.

The projection optical system 407 of the detection unit 400 projects the first and second pattern images 401 and 402 such that those first and second pattern images 401 and 402 have a predetermined positional relationship at the in-focus position 371 of the imaging optical system 370. The predetermined positional relationship refers to a positional relationship indicating an in-focus state. Hereinafter, a pattern formed by the first and second pattern images 401 and 402 having such a positional relationship is referred to as an in-focus pattern 420. Specifically, the first and second pattern images 401 and 402 form the in-focus pattern 420 at the in-focus position 371.

FIG. 2B shows a state where the in-focus pattern 420 is formed by the first and second pattern images 401 and 402. As shown in FIG. 2B, in this embodiment, the in-focus pattern 420 having a circular shape is formed. The upper half of the in-focus pattern 420 is the first pattern image 401, and the lower half thereof is the second pattern image 402.

The first pattern image 401 has a first center 421. The second pattern image 402 has a second center 422. The projection optical system 407 projects the first and second pattern images 401 and 402 such that the first and second centers 421 and 422 are adjacent to each other at the in-focus position 371. This allows easy determination that focal points are matched.

The shape of each of the first and second pattern images 401 and 402 and the shape of the in-focus pattern 420 formed by the first and second pattern images 401 and 402 are not limited. Further, when the in-focus pattern 420 is formed, both the centers of the first and second pattern images 401 and 402 are not necessarily adjacent to each other. For example, by the formation of the in-focus pattern 420 by the upper-half first pattern image 401 and the lower-half second pattern image 402, a visually recognizable shape such as a predetermined letter or mark may be configured.

In this embodiment, since the liquid crystal panels 410 and 412 are used, the shapes of the first and second pattern images 401 and 402 can be arbitrarily set and changed. For example, the liquid crystal panel 410 changes the shape of the first pattern image 401. The liquid crystal panel 412 then changes the shape of the second pattern image 402 into a shape corresponding to the changed shape of the first pattern image 401.

Additionally, using the liquid crystal panels 410 and 412, the number of first and second pattern images 401 and 402, sizes, colors, projected positions, and the like thereof can be easily set and changed. This will be described later in details.

FIGS. 3A and 3B are diagrams schematically showing the liquid crystal panel 410 and the liquid crystal panel 412, respectively. The liquid crystal panel 410 includes a plurality of first pixels 424. The liquid crystal panel 412 includes a plurality of second pixels 425. The controller 408 controls light transmittances in the first and second pixels 424 and 425, and thus an image is generated. It should be noted that FIGS. 3A and 3B schematically show the first pixels 424 and the second pixels 425, respectively, in an enlarged form.

As shown in FIG. 3A, in the plurality of first pixels 424, pixels used for forming the first pattern image 401 are referred to as first pattern image pixels 426 (a relationship between the image and the pixels is schematically shown). In this embodiment, the first pixels 424 located substantially at the center of the liquid crystal panel 410 are the first pattern image pixels 426.

As shown in FIG. 3B, in the plurality of second pixels 425, pixels used for forming the second pattern image 402 are referred to as second pattern image pixels 427. In this embodiment, the second pixels 425 located substantially at the center of the liquid crystal panel 412 are the second pattern image pixels 427. The positions of the first and second pattern image pixels 426 and 427, that is, pixels to be used as pattern image pixels are appropriately set so as to form the in-focus pattern 420 at the in-focus position 371.

The positions of the first pattern image pixels 426 on the liquid crystal panel 410 can be appropriately changed. The positions of the second pattern image pixels 427 can also be easily changed to positions corresponding to the changed positions of the first pattern image pixels 426. The positions of the first and second pattern image pixels 426 and 427 are changed, so that positions at which the first and second pattern images 401 and 402 are formed on the liquid crystal panels 410 and 412, respectively, are changed. This can appropriately change the projection positions of the first and second pattern images 401 and 420 that form the in-focus pattern 420.

Further, in accordance with the configurations of the first and second output sections 405 and 406 and the projection optical system 407, the positions of the first and second pattern image pixels 426 and 427 can also be changed. For example, it is assumed that the position of the second output section 406 is changed from the configuration exemplified in FIG. 2. In order that the second pattern image 402 output from the changed position of the second output section 406 forms the in-focus pattern 420 at the in-focus position 371, the positions of the second pattern image pixels 427 are changed. Such a change can also be made, for example. This can enhance the degree of freedom of the configuration of the detection unit 400 and enable the downsizing of the apparatus, for example.

In the case where the user adjusts a focal point, the work W such as a semiconductor substrate is mounted onto the stage 250 as shown in FIG. 2B, for example. The first and second pattern images 401 and 402 are then projected onto a surface S of the work W in a predetermined area. The surface S is an observation target. As shown in FIG. 2A, when the surface S of the work W is moved relative to the in-focus position 371, the first and second pattern images 401 and 402 are clearly displayed, without displacement to right and left, on a clearly displayed image of the work W. An in-focus pattern 420 having a circular shape is thus formed.

It should be noted that the in-focus position 371 of the imaging optical system 370 is typically a focal point position (just-focused position) of the imaging optical system 370. Further, a position included in the range of the depth of focus may be set as the in-focus position 371. At a position included in the range of the depth of focus, the in-focus pattern 420 is formed.

As shown in FIG. 2A, in the case where the surface S of the work W is displaced from the in-focus position 371 and is in a state of a front focus 373 or a rear focus 374, the first and second pattern images 401 and 402 are displaced to right and left along a border B. The amount of displacement to right and left in the first and second pattern images 401 and 402 corresponds to the amount of displacement from the in-focus position 371. Further, in the front focus 373 and the rear focus 374, the displacements to right and left occur in the opposite directions.

The user adjusts a focal point while looking into the eyepieces 350 such that the first and second pattern images 401 and 402 form the in-focus pattern 420. The user does not adjust a focal point while viewing the degree of blurring of the image of the work W, but adjusts a focal point while viewing the movements of the first and second pattern images 401 and 402 to right and left. This can highly accurately adjust a focal point.

Hereinafter, an example of the first and second pattern images 401 and 402 projected onto the work W will be described.

In an example shown in FIGS. 4A and 4B, a plurality of first pattern images 401a and 401b are generated by the liquid crystal panel 410. Further, a plurality of second pattern images 402a and 402b are generated by the liquid crystal panel 412. The plurality of second pattern images 402a and 402b correspond to the plurality of first pattern images 401a and 401b, respectively.

Specifically, the plurality of second pattern images 402a and 402b are generated to be paired with the plurality of first pattern images 401a and 401b, respectively, to form respective in-focus patterns 420. The projection optical system 407 performs projection such that the plurality of first pattern images 401a and 401b and the plurality of second pattern images 402a and 402b respectively corresponding thereto form the respective in-focus patterns 420 at respective different projection positions at the in-focus position 371.

For example, as shown in FIG. 4A, it is assumed that a work W having a step 10 is mounted onto the stage 250. The work W has a first surface S1 and a second surface S2 that are adjacent to each other via the step 10. In such a case, the plurality of first pattern images 401a and 401b and the plurality of second pattern images 402a and 402b are generated, and thus the first and second pattern images 401 and 402 can be projected onto both of the first and second surfaces S1 and S2.

In this example, a pair of the first and second pattern images 401a and 402a is projected onto the first surface S1. Additionally, a pair of the first and second pattern images 401b and 402b is projected onto the second surface S2. Each pair forms an in-focus pattern 420 when the projected surface is moved to the in-focus position 371.

FIG. 4A is a diagram showing a state where the first surface S1 is moved to the in-focus position 371. The first and second pattern images 401a and 402a projected onto the first surface S1 form the in-focus pattern 420. Since the second surface S2 is located at a position higher than the first surface S1, the position of the second surface S2 is away from the in-focus position 371. As a result, the first and second pattern images 401b and 402b are displaced to right and left.

For example, while looking into the eyepieces 350, the user first moves the first surface S1 to the in-focus position 371 and acquires XYZ coordinate values. The user then operates the rotating operation portion 321 of the Z-axis moving portion 320 to move the second surface S2 to the in-focus position 371, and then acquires XYZ coordinate values. For example, based on the acquired XYZ coordinate values of both of the first surface S1 and the second surface S2, the height of the second surface S2 with respect to the first surface S1 can be calculated.

As described in the above-mentioned Japanese Patent Application Laid-open No. Hei 10-142515, in the case where a pattern image is generated using slit masks, one pattern image is projected at the center of a work. In order to measure the height as described above, the stage is first moved such that the pattern image is projected onto the first surface S1. The focal point of the first surface S1 is adjusted to acquire XYZ coordinate values. The stage is then moved such that the pattern image is projected onto the second surface S2. The focal point of the second surface S2 is adjusted to acquire XYZ coordinate values. In such a manner, since the operation of moving the stage is required, operating steps are increased and thus measurement time is elongated. Further, there is a possibility that the measurement accuracy is reduced along the movement of the stage.

In contrast to this, in this embodiment, the plurality of first and second pattern images 401 and 402 can be projected. Additionally, the first and second pattern images 401 and 402 that form the in-focus pattern 420 can be projected at an arbitrary position of the work. This can adjust focal points of different areas of the work W to be matched without moving the position of the work W. This eliminates the need for movement of the stage 250, and thus can improve the operability, shorten measurement time, and improve measurement accuracy, for example. It should be noted that when the focal point of one of the first and second surfaces S1 and S2 is adjusted, the projection of the first and second pattern images 401 and 402 onto the other surface may be stopped.

It should be noted that in this embodiment, the first and second pattern images 401 and 402 are displaced to right and left along the border B shown in FIGS. 2A and 2B, due to the displacement from the in-focus position 371. As a result, the first and second pattern images 401 and 402 are projected at positions along the border B. However, the first and second pattern images 401 and 402 are not limited thereto and may be each projected at an arbitrary position in accordance with the configuration of the projection optical system 407 or the like. Additionally, the number of pairs of first and second pattern images 401 and 402, each pair of which forms the in-focus pattern 420, is also not limited.

In an example shown in FIGS. 5A and 5B, small-sized first and second pattern images 401 and 402 are generated in accordance with the size of the surface (area) to be projected. As described above, since the liquid crystal panels 410 and 412 are used, the first and second pattern images 401 and 402 having arbitrary shapes and sizes can be projected onto the work W.

For example, as shown in FIG. 5A, it is assumed that a minute convex portion 15 is formed at the center of the first surface S1 of the work W. Assuming that the surface of the convex portion 15 is the second surface S2, a dimension of the second surface S2 is very small. Further, the dimensions of two areas R1 and R2 of the first surface S1 are similarly very small. The two areas R1 and R2 sandwich the convex portion 15 therebetween.

As shown in FIG. 5B, three first pattern images 401a, 401b, and 401c are generated by the liquid crystal panel 410. Further, three second pattern images 402a, 402b, and 402c are generated by the liquid crystal panel 412. The three second pattern images 402a, 402b, and 402c are paired with the three first pattern images 401a, 401b, and 401c, respectively. Those first and second pattern images 401 and 402 are formed in the second surface S2 being a minute area having a small dimension and formed in the two areas R1 and R2, in the sufficient sizes for including the in-focus pattern 420.

As shown in FIG. 5A, the pair of the first and second pattern images 401a and 402a is projected onto the area R1 of the first surface S1. Further, the pair of the first and second pattern images 401b and 402b is projected onto the second surface S2. Moreover, the pair of the first and second pattern images 401c and 402c is projected onto the area R2 of the first surface S1. It should be noted that FIG. 5A is a diagram showing a state where the first surface S1 (areas R1 and R2) is moved to the in-focus position 371.

The user can adjust focal points of the first and second surfaces S1 and S2 highly accurately while viewing the first and second pattern images 401 and 402 projected onto the second surface S2 and the two areas R1 and R2.

Since the shapes and sizes of the first and second pattern images 401 and 402 can be arbitrarily set, the focal points of a minute area of the work W, an area having a specific shape, and the like can be adjusted highly accurately. For example, a minute hole formed on the work W, the height of a concave portion, and the like can be measured highly accurately.

In an example shown in FIGS. 6A and 6B, the first and second pattern images 401 and 402 each having a predetermined color are output by the first and second output sections 405 and 406, respectively. The first and second pattern images 401 and 402 that form the in-focus pattern 420 are provided with colors corresponding to each other.

The colors corresponding to each other typically refer to the same color, but different colors associated with each other may be provided. A color specifically used is not limited.

Each of the first and second output sections 405 and 406 is provided with a color-image generation section (not shown) for outputting the first and second pattern images 401 and 402 as color images. The configuration of the color-image generation section is not limited, and a known technique may be used therefor. For example, the color-image generation section and the liquid crystal panel 410 (412) may be integrally formed. For example, a color filter may be used as a member forming the color-image generation section. Alternatively, an optical system that splits light from a backlight into light of RGB colors may be used, for example.

In the example shown in FIG. 6A, a color filter as the work W is mounted onto the stage 250. The color filter includes a red R filter FR, a green G filter FG, and a blue B filter FB. The height of each filter is substantially equal. The first and second pattern images 401 and 402 are projected onto those RGB filters FR, FG, and FB.

As shown in FIG. 6B, by the liquid crystal panels 410 and 412 and the color-image generation sections provided to the first and second output sections 405 and 406, the first and second pattern images 401c and 402c are generated in cyan as a complementary color of red, the first and second pattern images 401b and 402b are generated in magenta as a complementary color of green, and the first and second pattern images 401a and 402a are generated in yellow as a complementary color of blue. It should be noted that FIG. 6B schematically shows the colored first and second pattern images 401 and 402 on the liquid crystal panels 410 and 412.

As shown in FIG. 6A, the first and second pattern images 401c and 402c in cyan are projected onto the R filter FR. The first and second pattern images 401b and 402b in magenta are projected onto the G filter FG. The first and second pattern images 401a and 402a in yellow are projected onto the B filter FB. Since the first and second pattern images 401 and 402 are projected in a complementary color with respect to each of the filters FR, FG, and FB, the visibility of the user can be improved and a focal point can be adjusted highly accurately. In such a manner, in accordance with the color of the surface to be observed of the work W, the colors of the first and second pattern images 401 and 402 can be appropriately set. The surface to be observed is an area for which the focal point is adjusted, and corresponds to an area to which the first and second pattern images of the work W are applied.

It should be noted that the number of first and second pattern images 401 and 402, shapes, sizes, colors, projection positions, and the like thereof are typically set by the user via a console or the like. The setting method is not limited. For example, various types of first and second pattern images 401 and 402 having preset colors and shapes may be stored in storage or the like of the detection unit 400. From the stored various types of first and second pattern images 401 and 402, an image desired by the user may be selected appropriately.

Hereinabove, in the focus detection unit 400 according to this embodiment, the liquid crystal panels 410 and 412 generate the first and second pattern images 401 and 402 that are references for adjusting the focal point. This enables appropriate setting of the shapes, the projection positions, and the like of the first and second pattern images 401 and 402. As a result, the focal point can be adjusted highly accurately, and the operability of a microscope can be improved. It should be noted that the focus detection unit 400 can be used irrespective of the magnification of the objective lens 360.

OTHER EMBODIMENTS

The present disclosure is not limited to the embodiment described above and can achieve other various embodiments.

Figure 7:
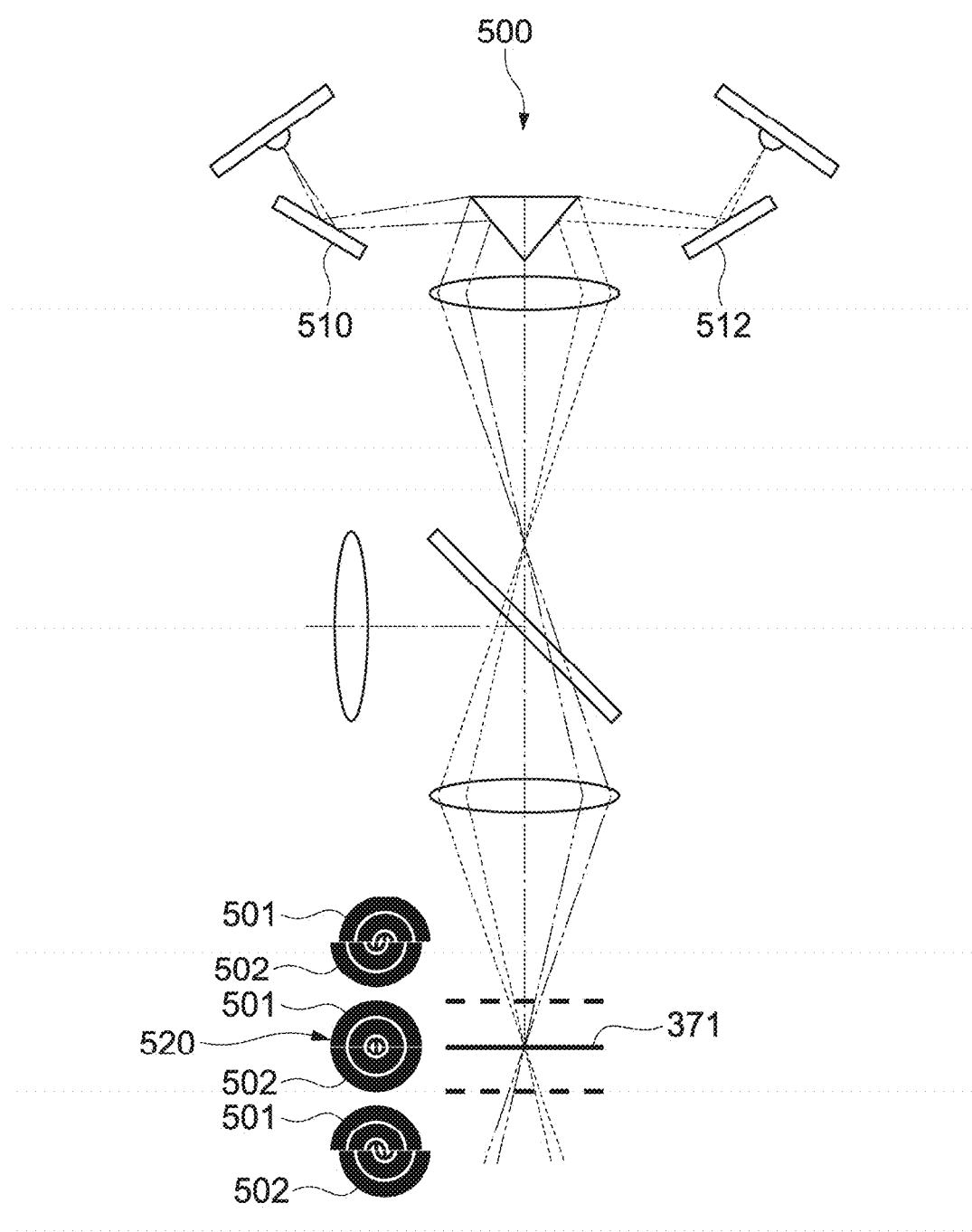
FIG. 7 is a diagram schematically showing a configuration example of a detection unit according to another embodiment of the present disclosure.

For example, FIG. 7 is a diagram schematically showing a configuration example of a detection unit according to another embodiment of the present disclosure.

In a detection unit 500 of this embodiment, reflective digital micromirror devices (DMD) 510 and 512 are used as first and second light modulation elements. In this case as well, first and second pattern images 501 and 502 can be projected so as to form an in-focus pattern 520 at an in-focus position 371 and so as to be displaced to right and left at a position deviated from the in-focus position 371. Additionally, the effects described above can be exerted. It should be noted that a specific configuration of the DMD is not limited.

In addition, devices other than the liquid crystal panel and the DMD may be used as the first and second light modulation elements.

The coordinates of a projection surface onto which first and second pattern images are projected, the height from a reference surface, and the like may be calculated based on a positional relationship between the first and second pattern images formed by the imaging optical system. The microscope is thus provided with a calculation section including a CPU, a ROM, and the like.

For example, it is assumed that a first reference pattern image, which is a reference in a plurality of first pattern images projected onto a work, and a second reference pattern image corresponding to the first reference pattern image form an in-focus pattern on a first projection surface on which those first reference pattern image and second reference pattern image are projected. Specifically, this is a state where the first projection surface is in focus. At that time, another one of the plurality of first pattern images and another second pattern image corresponding to this first pattern image are assumed to be projected onto a second projection surface that is different from the first projection surface. In such a state, the height of the second projection surface with respect to the first projection surface may be calculated by the calculation section based on a positional relationship between the other first and second pattern images projected onto the second projection surface.

Applying this to the example of FIG. 4A, the first and second pattern images 401a and 402a that form the in-focus pattern 420 on the first surface S1 correspond to the first and second reference pattern images. The first and second pattern images 401b and 402b projected onto the second surface S2 correspond to the other first and second pattern images. Additionally, the first surface S1 corresponds to the first projection surface, and the second surface S2 corresponds to the second projection surface. In the state shown in FIG. 4A, the height of the second surface S2 with respect to the first surface S1 may be calculated by the calculation section based on a displacement between the first and second pattern images 401b and 402b. This can save time and effort to adjust the focal point of the second surface S2.

The detection unit may be provided with a sensor capable of detecting the color of the work, for example. Additionally, the colors of the first and second pattern images may be automatically set in accordance with the color of the work.

In the description above, the microscope has been exemplified as an optical apparatus according to one embodiment of the present disclosure. However, the present disclosure is not limited to be applied to the microscope and is applicable to various optical apparatuses such as an apparatus that performs an observation and a measurement using a formed image of a subject and an apparatus that captures an image of a subject and performs an observation, a measurement, and the like using the captured image. Examples of such apparatuses include a CNC (Computer Numerical Control) vision measuring system and a CNC coordinate measuring machine.

Of the features of the embodiments described above, at least two of the features can be combined. Further, various effects described in the above embodiments are merely exemplary ones and are not restrictive ones, and any other effects may be produced.

What is claimed is:

1. A focus detection unit to adjust a focal point of an image, of an object, formed by an optical system, the focus detection unit comprising:
    a first spatial light modulator configured to generate a first pattern image by modulating incident light in response to an image signal, and to output the generated first pattern image;
    a second spatial light modulator configured to generate a second pattern image by modulating incident light in response to an image signal, and to output the generated second pattern image; and
    a projection optical system configured to project the output first pattern image and the output second pattern image such that the output first pattern image and the output second pattern image have a predetermined positional relationship at an in-focus position of the optical system.

2. The focus detection unit according to claim 1, wherein the first pattern image has a first center,
    the second pattern image has a second center, and
    the projection optical system is configured to project the first pattern image and the second pattern image such that the first center and the second center are adjacent to each other at the in-focus position.

3. The focus detection unit according to claim 1, wherein the first spatial light modulator is capable of changing a shape of the first pattern image, and
    the second spatial light modulator is capable of changing a shape of the second pattern image into a shape corresponding to the changed shape of the first pattern image.

4. The focus detection unit according to claim 3, wherein the second spatial light modulator changes a shape of the second pattern image to be line symmetric to the changed shape of the first pattern image at the in-focus position.

5. The focus detection unit according to claim 3, wherein the second spatial light modulator changes a shape of the second pattern image such that each background color portion of the first pattern image is adjacent to a pattern color portion of the second pattern image at the in-focus position.

6. The focus detection unit according to claim 1, wherein the first spatial light modulator includes a plurality of first pixels and is capable of changing positions of first pattern image pixels in the plurality of first pixels, the first pattern image pixels forming the first pattern image, and
    the second spatial light modulator includes a plurality of second pixels and is capable of changing positions of second pattern image pixels in the plurality of second pixels to positions corresponding to the changed positions of the first pattern image pixels, the second pattern image pixels forming the second pattern image.

7. The focus detection unit according to claim 1, wherein the first spatial light modulator is configured to generate a plurality of first pattern images,
    the second spatial light modulator is configured to generate a plurality of second pattern images respectively corresponding to the plurality of first pattern images, and
    the projection optical system is configured to project the plurality of first pattern images and the plurality of second pattern images respectively corresponding to the plurality of first pattern images at different projection positions such that each of the plurality of first pattern images and a corresponding one of the plurality of second pattern images have the predetermined positional relationship at the in-focus position of the optical system.

8. The focus detection unit according to claim 1, wherein the first spatial light modulator is configured to output the first pattern image having a predetermined color, and
    the second spatial light modulator is configured to output the second pattern image having a color corresponding to the predetermined color.

9. The focus detection unit according to claim 8, wherein the predetermined color and the color corresponding to the predetermined color are the same color and are each a complementary color with respect to a color of an area onto which the first pattern image and the second pattern image of the object are projected.

10. The focus detection unit according to claim 1, wherein each of the first spatial light modulator and the second spatial light modulator includes a liquid crystal panel.

11. The focus detection unit according to claim 1, wherein each of the first spatial light modulator and the second spatial light modulator includes a micromirror device.

12. The focus detection unit according to claim 1, wherein the first spatial light modulator and the second spatial light modulator do not have a slit mask.

13. The focus detection unit according to claim 1, further comprising a controller that provides the image signal to the first spatial modulator to generate the first pattern image, and provides the image signal to the second spatial modulator to generate the second pattern image.

14. An optical apparatus, comprising:
    a mount configured to mount an object;
    an imaging optical system configured to form an image of the object mounted onto the mount; and
    a focus detector configured to adjust a focal point of the formed image of the object, the focus detector including
    a first spatial light modulator configured to generate a first pattern image by modulating incident light in response to an image signal, and to output the generated first pattern image,
    a second spatial light modulator configured to generate a second pattern image by modulating incident light in response to an image signal, and to output the generated second pattern image, and
    a projection optical system configured to project the output first pattern image and the output second pattern image such that the output first pattern image and the output second pattern image have a predetermined positional relationship at an in-focus position of the imaging optical system.

15. The optical apparatus according to claim 14, wherein
the first spatial light modulator is configured to generate a plurality of first pattern images,
the second spatial light modulator is configured to generate a plurality of second pattern images respectively corresponding to the plurality of first pattern images, and
the projection optical system is configured to project the plurality of first pattern images and the plurality of second pattern images respectively corresponding to the plurality of first pattern images at different projection positions such that each of the plurality of first pattern images and a corresponding one of the plurality of second pattern images have the predetermined positional relationship at the in-focus position of the optical system.

16. The optical apparatus according to claim 15, further comprising a calculator configured to calculate, when a first reference pattern image to be a reference in the plurality of first pattern images and a second reference pattern image corresponding to the first reference pattern image form an image having the predetermined positional relationship, based on a positional relationship between another one of the plurality of first pattern images and a corresponding one of the plurality of second pattern images, the first reference pattern image and the second reference pattern image being projected onto a first projection surface, the other first pattern image and the second pattern image corresponding to the other first pattern image being projected onto a second projection surface, a height of the second projection surface with respect to the first projection surface.

* * * * *